United States Patent
Singuru et al.

(10) Patent No.: US 11,167,769 B2
(45) Date of Patent: Nov. 9, 2021

(54) METHOD AND APPARATUS FOR MANAGING OPERATOR-SELECTABLE SETTINGS ON-VEHICLE

(71) Applicant: GM GLOBAL TECHNOLOGY OPERATIONS LLC, Detroit, MI (US)

(72) Inventors: Kausalya Singuru, Troy, MI (US); Donald K. Grimm, Utica, MI (US); Bakhtiar B. Litkouhi, Washington, MI (US); Yasen Hu, Warren, MI (US); Nicholas W. Pinto, Shelby Township, MI (US); Yao Hu, Sterling Heights, MI (US); Shiming Duan, Ann Arbor, MI (US); Bradley R. Frieberg, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 16/450,248

(22) Filed: Jun. 24, 2019

(65) Prior Publication Data
US 2020/0398860 A1    Dec. 24, 2020

(51) Int. Cl.
| | |
|---|---|
| B60W 50/08 | (2020.01) |
| B60W 40/09 | (2012.01) |
| G05D 1/00 | (2006.01) |
| B60W 30/09 | (2012.01) |

(Continued)

(52) U.S. Cl.
CPC ......... *B60W 50/085* (2013.01); *B60W 30/09* (2013.01); *B60W 30/12* (2013.01); *B60W 30/14* (2013.01); *B60W 40/09* (2013.01); *G05D 1/0088* (2013.01); *G05D 2201/0213* (2013.01)

(58) Field of Classification Search
CPC .......... B60W 50/085; B60W 50/0098; B60W 40/09; B60W 30/09; B60W 30/14; B60W 30/12; B60W 2540/043; B60W 2050/0089; B60W 60/0013; G05D 1/0088; G05D 2201/0213; B60R 16/037
See application file for complete search history.

(56) References Cited

U.S. PATENT DOCUMENTS

| | | | |
|---|---|---|---|
| 10,692,371 B1 * | 6/2020 | Nix | ............................. G01S 5/14 |
| 2010/0280711 A1 | 11/2010 | Chen et al. | |
| 2014/0207342 A1 | 7/2014 | Chen et al. | |

(Continued)

*Primary Examiner* — Michael J Zanelli
(74) *Attorney, Agent, or Firm* — Quinn IP Law

(57) ABSTRACT

A vehicle including an advanced driver-assistance system (ADAS) and operator-adjustable devices is described. Controlling the vehicle includes identifying a vehicle operator, and capturing a plurality of operator-selectable settings associated with the plurality of operator-adjustable devices for the vehicle operator. A base profile and a second profile are determined for the vehicle operator based upon the first subset associated with non-autonomous operation of the vehicle and the second subset associated with ADAS, respectively. The plurality of operator-adjustable devices are controlled to the operator-selectable settings associated with the base profile when the vehicle is operating in the non-autonomous mode, and the plurality of operator-adjustable devices are controlled to the operator-selectable settings associated with the second profile when the vehicle is being controlled at least in part by one or more of the subsystems of the ADAS.

13 Claims, 3 Drawing Sheets

(51) Int. Cl.
*B60W 30/14* (2006.01)
*B60W 30/12* (2020.01)

(56) References Cited

U.S. PATENT DOCUMENTS

| | | | | |
|---|---|---|---|---|
| 2017/0334450 | A1* | 11/2017 | Shiraishi | B60W 30/06 |
| 2017/0369052 | A1* | 12/2017 | Nagy | B60W 30/14 |
| 2017/0369076 | A1* | 12/2017 | Goo | B60G 17/0195 |
| 2018/0029501 | A1* | 2/2018 | Wolf | B60W 50/14 |
| 2018/0170392 | A1* | 6/2018 | Yang | B60W 40/09 |
| 2018/0222350 | A1* | 8/2018 | Hirayama | B60N 2/0244 |
| 2018/0244175 | A1* | 8/2018 | Tan | B60N 2/22 |
| 2019/0291719 | A1* | 9/2019 | Tiziani | B60W 50/085 |

* cited by examiner

METHOD AND APPARATUS FOR MANAGING OPERATOR-SELECTABLE SETTINGS ON-VEHICLE

INTRODUCTION

Vehicles include a plurality of devices and systems having operator-selectable settings, which permit an operator to customize the settings according to personal preferences, including, e.g., settings for seats, mirrors, climate control, infotainment, etc. A vehicle may include a capability to set these devices and systems to a particular desirable setting, and then allow the operator to record those settings as pre-sets by activating a storing button, which can be subsequently employed to return the devices to their customized setting. There may be multiple preset buttons, each corresponding to one of multiple vehicle operators. Thus, the various vehicle systems and devices may be returned to desirable positions for a particular operator by a single action. Storing vehicle device pre-sets as described above provides an operator convenience factor, but may require the operator to perform some operation, such as pressing a button, for the system to recognize the driver. In order to further increase the convenience for the vehicle driver, various systems have been proposed that automatically recognize the operator and perform some convenience function in response thereto.

However, current methods of personalizing settings may not be adaptable to an operator's changing preferences. Furthermore, an operator's preferences may change during vehicle operation, such as in response to activation of an advanced driver-assistance system (ADAS).

SUMMARY

A vehicle including an advanced driver-assistance system (ADAS) and one or a plurality of operator-adjustable devices is described. A method for controlling the vehicle includes identifying a vehicle operator, and capturing a plurality of operator-selectable settings associated with the plurality of operator-adjustable devices for the vehicle operator. The operator-selectable settings include a first subset of the operator-selectable settings associated with non-autonomous operation of the vehicle, and a second subset of the operator-selectable settings associated with activation of the ADAS. A base profile and a second profile are determined for the vehicle operator based upon the first subset associated with non-autonomous operation of the vehicle and the second subset associated with ADAS, respectively. The plurality of operator-adjustable devices are controlled to the operator-selectable settings associated with the base profile when the vehicle is operating in the non-autonomous mode, and the plurality of operator-adjustable devices are controlled to the operator-selectable settings associated with the second profile when the vehicle is being controlled at least in part by one or more of the subsystems of the ADAS.

An aspect of the disclosure includes capturing the plurality of the operator-selectable settings associated with the plurality of operator-adjustable devices, wherein the operator-selectable settings include a third subset of the operator-selectable settings associated with activation of a second subsystem of the ADAS by the first vehicle operator, determining a third profile for the first vehicle operator based upon the third subset associated with the second subsystem of the ADAS, and controlling the plurality of operator-adjustable devices to the operator-selectable settings associated with the third profile in response to the activation of the first subsystem of the ADAS.

Another aspect of the disclosure includes capturing the plurality of operator-selectable settings associated with the plurality of operator-adjustable devices during each of a plurality of trips, wherein the operator-selectable settings include the first subset of the operator-selectable settings associated with non-autonomous operation of the vehicle by the first vehicle operator during each of the plurality of trips.

Another aspect of the disclosure includes determining the base profile for the first vehicle operator based upon the first subset of the operator-selectable settings associated with non-autonomous operation of the vehicle capturing during the plurality of trips.

Another aspect of the disclosure includes determining the base profile for the first vehicle operator based upon the first subset of the operator-selectable settings by executing a cluster analysis of the first subset of the operator-selectable settings.

Another aspect of the disclosure includes capturing the plurality of the operator-selectable settings associated with the plurality of operator-adjustable devices during each of a plurality of trips, wherein the operator-selectable settings include the second subset of the operator-selectable settings associated with activation of the first subsystem of the ADAS by the first vehicle operator.

Another aspect of the disclosure includes determining the second profile for the first vehicle operator based upon the second subset associated with the first level of ADAS operation by executing a cluster analysis of the second subset of the operator-selectable settings.

Another aspect of the disclosure includes identifying a second vehicle operator, and capturing a plurality of operator-selectable settings associated with a plurality of operator-adjustable devices, wherein the operator-selectable settings include a first subset of the operator-selectable settings associated with non-autonomous operation of the vehicle by the second vehicle operator. A plurality of the operator-selectable settings associated with the plurality of operator-adjustable devices are captured, wherein the operator-selectable settings include a second subset of the operator-selectable settings associated with activation of a first subsystem of the ADAS by the second vehicle operator. A base profile for the second vehicle operator is determined based upon the first subset associated with non-autonomous operation of the vehicle. This includes determining a second profile for the second vehicle operator based upon the second subset associated with the first level of ADAS operation of the vehicle, and controlling the plurality of operator-adjustable devices to the operator-selectable settings associated with the base profile when the vehicle is operated by the second vehicle operator under the non-autonomous operation. The plurality of operator-adjustable devices are controlled to the operator-selectable settings associated with the second profile in response to the activation of the first subsystem of the ADAS when the vehicle is operated by the second vehicle operator at the first level of ADAS operation of the vehicle.

Another aspect of the disclosure includes the first subsystem of the ADAS being one of an adaptive cruise control system, a lane-keeping control system, a lane change control system, and an autonomous braking/collision avoidance system.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
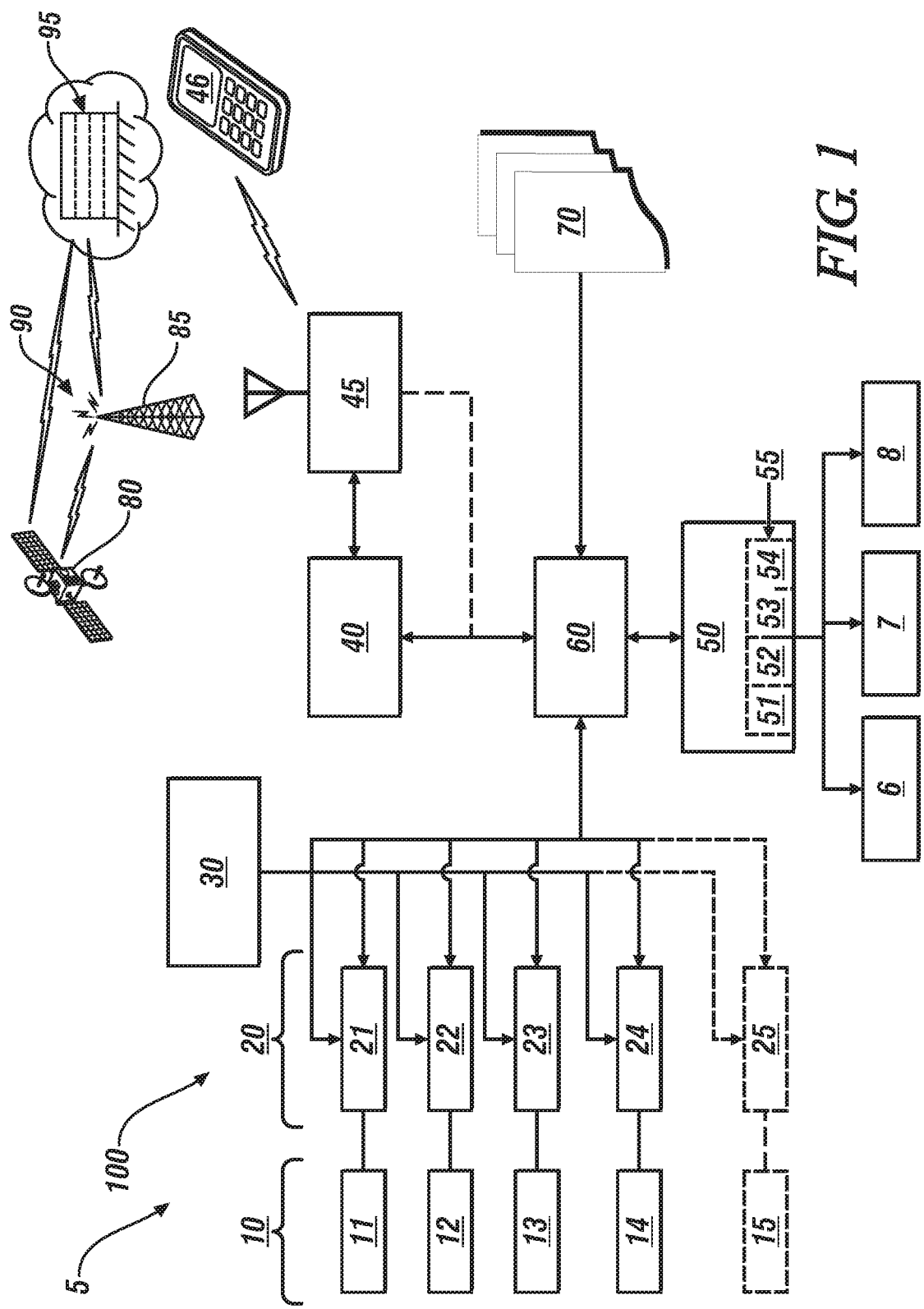
FIG. 1 schematically shows a block diagram of a control system for a vehicle that includes operator-adjustable devices and an advanced driver-assistance system (ADAS), in accordance with the disclosure.

Referring now to the drawings, wherein the showings are for the purpose of illustrating certain exemplary embodiments, and not for the purpose of limiting the same, FIG. 1 schematically shows, in block diagram form, a control system 100 for a vehicle 5 that is arranged to manage operator-selectable preferences on-vehicle. The control system 100 includes a plurality of operator-adjustable devices 10 and associated actuators 20, human-machine interface (HMI) device(s) 30, operator recognition system 40, an advanced driver-assistance system (ADAS) 50, and a controller 60 in communication with a settings database 70. The controller 60 is in communication with a telematics device 45 that is capable of executing extra-vehicle communication, including communicating with an off-board controller 95 via a communication network 90 including a satellite 80, an antenna 85, and/or another communication mode.

The vehicle 5 includes a propulsion system 6, a wheel braking system 7, and a steering system 8, the operations of which may be controlled by a vehicle operator who is situated in a passenger compartment. The operation of the propulsion system 6, the wheel braking system 7, and the steering system 8 may be controlled by direct interaction with the vehicle operator alone, or in combination with the ADAS 50. The vehicle 5 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The ADAS 50 is arranged to provide operator assistance features by controlling one or more of the propulsion system 6, the wheel braking system 7, and the steering system 8 with little or no direct interaction of the vehicle operator. The ADAS 50 includes a controller and one or a plurality of subsystems 55 that provide operator assistance features, including one or more of an adaptive cruise control (ACC) system 51, a lane-keeping control (LKY) system 52, a lane change control (LCC) system 53, an autonomous braking/collision avoidance system 54, and/or other systems that are configured to command and control autonomous vehicle operation separate from or in conjunction with operator requests. The ADAS 50 may interact with and access information from an on-board map database for route planning and to control operation of the vehicle 5 via the lane-keeping system, the lane-centering system, and/or other systems that are configured to command and control autonomous vehicle operation. Autonomous operating commands may be generated to control the ACC system 51, the LKY system 52, the LCC system 53, the autonomous braking/collision avoidance system 54, and/or the other systems. Vehicle operation includes operation in a propulsion mode in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc.

The operator-adjustable devices 10 and associated actuators 20 include a plurality of on-vehicle devices that have positional settings or operational settings that may be individually customizable by one or a plurality of operators as a part of operation of the vehicle 5. Examples of the operator-adjustable devices 10 and associated actuators 20 include, by way of non-limiting examples, side-view mirrors 11 and actuator 21; multi-positional seats 12 including bottom, height, back, lumbar support, etc., and actuator(s) 22; climate control (HVAC) 13 and actuator 23; infotainment (Radio) 14 and actuator 24; and, other operator-adjustable devices 15 and actuator(s) 25. The other operator-adjustable devices 15 may include, without limitation, steering wheel position, pedal position, seat headrest position, etc.

The human-machine interface (HMI) system 30 provides for human/machine interaction with the vehicle, for purposes of customizing settings of various on-vehicle devices, including the operator-adjustable devices 10, in accordance with operator-desired preferences. Devices associated with the HMI system 30 may include manually-manipulable switches, inputs via a touch-screen, etc., which may be employed to control the actuators 20 to achieve desired settings for the operator-adjustable devices 10. The actuators 20 also provide some form of position feedback to the HMI system 30. The HMI system 30 and/or the actuators 20 are in communication with the controller 60, and communicate the settings of the operator-adjustable devices 10 to the controller 60.

In addition, the HMI system 30 may be employed to control operation of the infotainment system 14, access and control an on-board navigation system, etc. The HMI system 30 monitors operator requests and provides information to the operator including status of vehicle systems, service and maintenance information. The HMI system 30 communicates with and/or controls operation of a plurality of in-vehicle operator interface device(s). The HMI system 30 may also communicate with one or more devices that monitor biometric data associated with the vehicle operator, including, e.g., eye gaze location, posture, and head position tracking, among others. The HMI system 30 is depicted as a unitary device for ease of description, but may be configured as a plurality of controllers and associated sensing devices in an embodiment of the system described herein. The in-vehicle operator interface device(s) can include devices that are capable of transmitting a message urging operator action, and can include an electronic visual display module, e.g., a liquid crystal display (LCD) device, a heads-up display (HUD), an audio feedback device, a wearable device, and a haptic device such as a haptic seat.

The operator recognition system 40 is composed of one or more devices and systems that interact with and identify the vehicle operator. The operator recognition system 40 may include an on-vehicle system that communicates with and interacts with a key fob, a handheld device 46 such as a cellular phone, or another device that may be carried by the vehicle operator and is capable of some form of wireless communication through which the vehicle operator is actively or passively identified. The operator recognition system 40 may include an on-vehicle system in the form of a keypad or other device through which a vehicle operator enters a unique code through which the vehicle operator is identified. Alternatively or in addition, the operator recognition system 40 may include a biometric sensing system in the form of a voice recognition system, a fingerprint scanner, a facial recognition system, body posture and dimensions, and/or another method through which the vehicle operator is identified. When the vehicle operator is identified via the operator recognition system 40, the controller 60 is able to communicate with the settings database 70 to access the vehicle operator's credentials and obtain settings for the operator-adjustable devices 10, e.g., seat position, HVAC temperature settings, etc.

The telematics device 45 includes a wireless telematics communication system capable of extra-vehicle communications, including communicating with a communication network system having wireless and wired communication capabilities. The telematics device 45 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively or in addition, the telematics device 45 has a wireless telematics communication system capable of short-range wireless communication to the handheld device 46, e.g., a cell phone, a satellite phone or another telephonic device. In one embodiment the handheld device 46 is loaded with a software application that includes a wireless protocol to communicate with the telematics device 45 to effect identification of the vehicle operator, as described with reference to FIG. 4. In one embodiment, the handheld device 46 executes the extra-vehicle communication, including communicating with an off-board controller 95 via a communication network 90 including a satellite 80, an antenna 85, and/or another communication mode. Alternatively or in addition, the telematics device 45 executes the extra-vehicle communication directly by communicating with the off-board controller 95 via the communication network 90. In one embodiment, the off-board controller 95 is cloud-based.

The term "controller", including controller 60, and related terms such as control module, module, control, control unit, processor and similar terms refer to various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component(s) is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. There may be a single controller, or a plurality of controllers. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
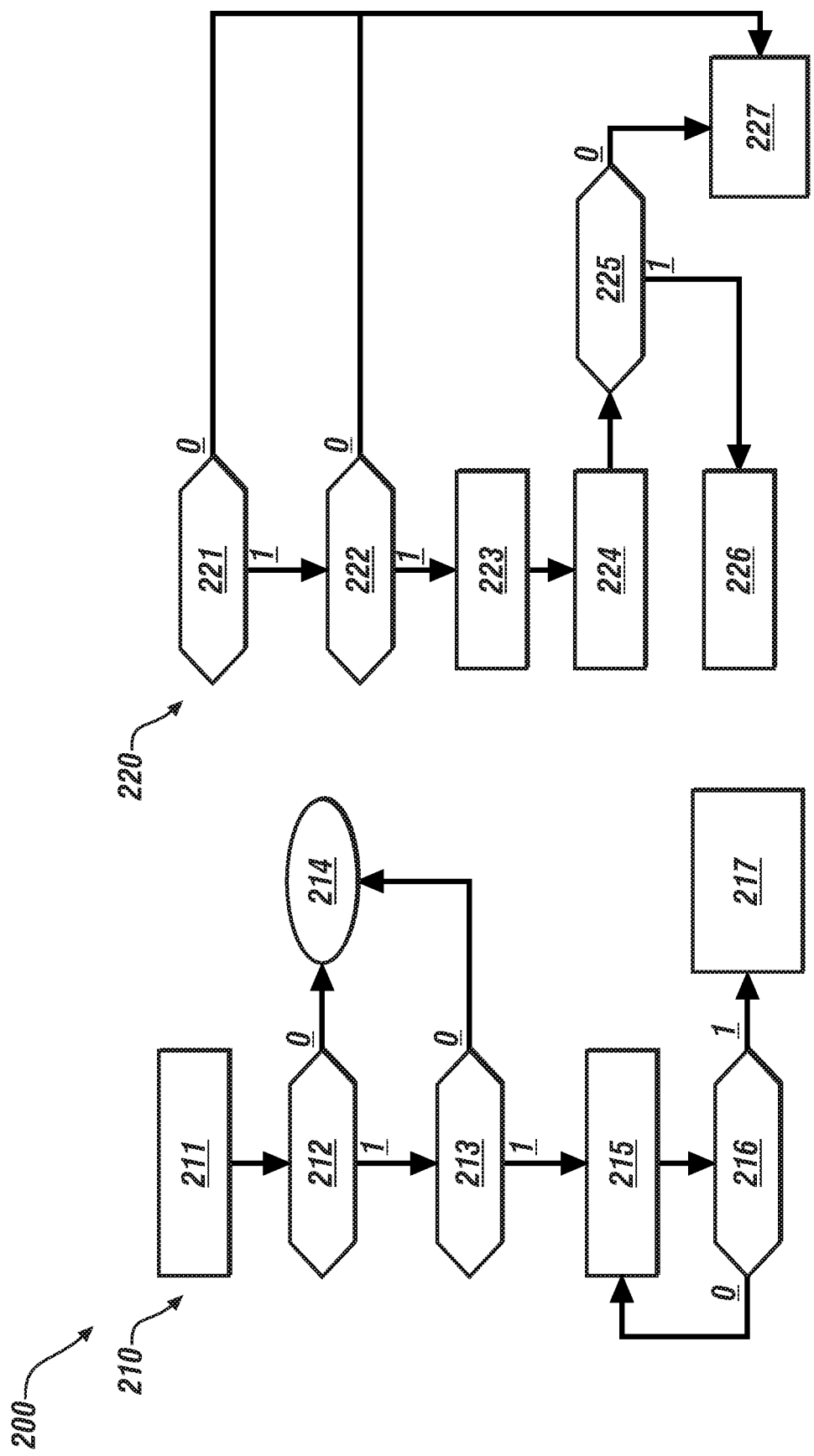
FIG. 2 schematically shows a block diagram of an operator profile development routine that is arranged to manage operator-selectable preferences for an embodiment of the vehicle that is described with reference to FIG. 1, in accordance with the disclosure.

Referring now to FIG. 2, with continued reference to FIG. 1, a method for controlling the vehicle 5 includes identifying a vehicle operator, and capturing a plurality of operator-selectable settings associated with the plurality of operator-adjustable devices for the vehicle operator. The operator-selectable settings include a first subset of the operator-selectable settings associated with non-autonomous operation of the vehicle by the vehicle operator, and a second subset of the operator-selectable settings associated with autonomous operation of the vehicle by the vehicle operator. A base profile and a second profile are determined for the vehicle operator based upon the first subset associated with non-autonomous operation of the vehicle 5 and the second subset associated with autonomous operation of the vehicle 5, respectively. The plurality of operator-adjustable devices 10 are controlled to the operator-selectable settings associated with the base profile when the vehicle 5 operating in the non-autonomous mode and is being controlled by the operator. The plurality of operator-adjustable devices 10 are controlled to the operator-selectable settings associated with the second profile when the vehicle 5 is being controlled at least in part by one or more of the subsystems 55 of the ADAS 50, i.e., the vehicle is operating in an autonomous mode.

Referring now to FIG. 2, details associated with an embodiment of this arrangement are described, including an operator profile development routine 200 for controlling operation of an embodiment of the control system 100 for the vehicle 5 that is arranged to manage operator-selectable preferences, as described with reference to FIG. 1. There may be multiple operators of the vehicle 5, and the concepts described with reference to the operator profile development routine 200 may be executed for each of the operators in conjunction with each of the operators having been identified by the operator recognition system 40. Table 1 is provided as a key wherein the numerically labeled blocks and the corresponding functions are set forth as follows, corresponding to an embodiment of the operator profile development routine 200. The teachings may be described herein in terms of functional and/or logical block components and/or various processing steps that may be executed in the controller. The block components may be composed of hardware, software, and/or firmware components that have been configured to perform the specified functions.

TABLE 1

| BLOCK | BLOCK CONTENTS |
|---|---|
| 210 | First n Trips |
| 211 | Capture and save current settings associated with operator |
| 212 | Are there any changes in activation of the ADAS? |
| 213 | Are any changes detected in operator operator-adjustable devices? |
| 214 | End iteration |
| 215 | Capture changes |
| 216 | Sample quantity sufficient? |
| 217 | Execute cluster analysis |
| 220 | Nth Trip |
| 221 | New trip? |
| 222 | Are there any changes in activation of the ADAS? |
| 223 | Update cluster analysis |
| 224 | Determine new settings for table |
| 225 | Operator confirmation to update settings |
| 226 | Update settings |
| 227 | Do not update settings |

The operator profile development routine 200 is executed for one or a plurality of operators of the vehicle 5. Identification of each operator is described with reference to FIG. 4. The steps of the operator profile development routine (routine) 200 may be executed in order, but are not limited to the order described with reference to FIG. 2. As employed herein, the term "1" indicates an answer in the affirmative, or "YES", and the term "0" indicates an answer in the negative, or "NO".

The routine 200 includes a first portion 210, which executes upon detection and identification of a new operator during a first trip and during n subsequent trips, where n is a calibratable scalar integer. The routine 200 generates a base operator profile for each identified operator as a baseline at a start of each of the n trips (211). The base operator profile is captured as a first data subset that includes the operator settings to the operator-adjustable devices 10 at the start of each of the n trips, and is associated with operation of the vehicle 5 in the non-autonomous mode.

During each of the n trips, activation of one or more of the subsystems 55 of the ADAS 50 is monitored (212). When there is no activation of one of the subsystems 55 of the ADAS 50 (212)(0), operation of the first portion 210 ends without further action (214). When a first one of the subsystems 55 of the ADAS 50 is activated (212)(1), the routine 200 monitors and captures the operator settings to the operator-adjustable devices 10 to determine whether change(s) are made to one or more of the operator-adjustable devices 10 subsequent to activation of the first one of the subsystems 55 of the ADAS 50 (213). When change(s) have been made to one or more of the operator-adjustable devices 10 (213)(1), the detected difference(s) are captured and stored, along with identification of the first one of the subsystems 55 of the ADAS 50 that has been activated (215).

The routine 200 may generate a second operator profile for the identified operator, which includes operator settings to the operator-adjustable devices 10 after activation of the first one of the subsystems 55 of the ADAS 50 during each of the n trips. The second operator profile is captured as a second data subset after activation of the first of the subsystems 55 of the ADAS 50, and is associated with operation of the vehicle 5 with the activated first one of the subsystems 55.

In like manner, the routine 200 may generate a third operator profile, which includes operator settings to the operator-adjustable devices 10 after activation of a second one of the subsystems 55 of the ADAS 50 during each of the n trips. The third operator profile is captured as a third data subset that includes the operator settings to the operator-adjustable devices 10 after activation of the second of the subsystems 55 of the ADAS 50, and is associated with operation of the vehicle 5 with the activated subsystem.

In like manner, the routine 200 may generate one or a plurality of subsequent operator profiles, which includes operator settings to the operator-adjustable devices 10 after activation of a third or subsequent one of the subsystems 55 of the ADAS 50 during each of the n trips. The one or plurality of subsequent operator profiles is captured as a fourth or subsequent data subset that includes the operator settings to the operator-adjustable devices 10 after activation of the third or subsequent one of the subsystems 55 of the ADAS 50, and is associated with operation of the vehicle 5 with the activated subsystem.

Steps 211-215 are repeated during each of the n subsequent trips with the new operator to obtain the first, second, third, fourth or subsequent data subsets. It is appreciated that there may be data subsets associated with each of the subsystems 55 of the ADAS 50, or with combinations of the subsystems 55 of the ADAS 50, or with a selected one or more of the subsystems 55 of the ADAS 50.

The data subsets are subjected to a cluster analysis (217), which is executed to determine a base profile, a second profile, a third profile, etc. that are associated with the corresponding data subsets and eliminate data singularities in the form of data outliers. The cluster analysis (217) is a process that groups parameters into a plurality of clusters, such that the parameters in the same cluster are more similar to each other than to those parameters in another cluster. Data singularities may be eliminated from clusters using a silhouette calculation with Euclidean distance measurement, or an analytical technique. Referring again to FIG. 1, the cluster analysis (217) can be expressed in algorithmic form that can be reduced to practice as an executable instruction set that is stored in the controller 60, the off-board controller 95, a hand-held device, or elsewhere.

Figure 3:
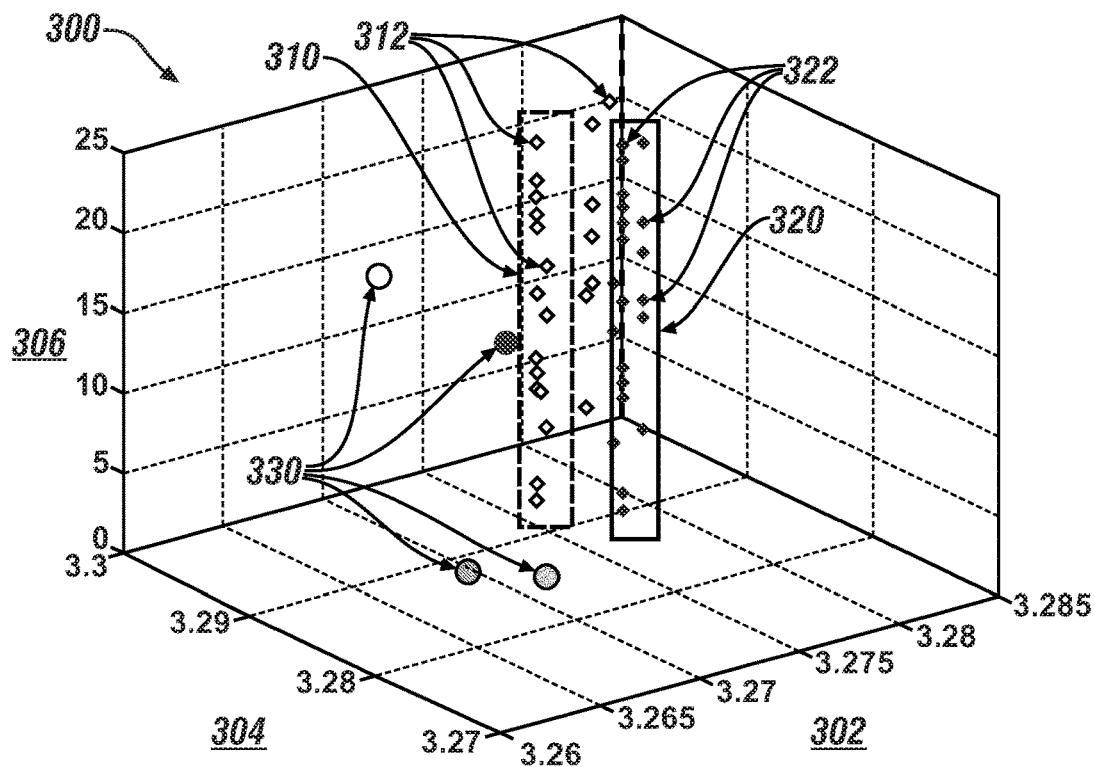
FIG. 3 graphically shows, in three-dimensional perspective, a data subset that includes a plurality of first datapoints and a second data subset that are subjected to cluster analysis that is described with reference to FIG. 2, in accordance with the disclosure.

FIG. 3 graphically shows, in three-dimensional perspective, a first data subset 310 that includes a plurality of first datapoints 312 that are subjected to cluster analysis, and a second data subset 320 that includes and a plurality of second datapoints 322 that are subjected to cluster analysis, as part of the cluster analysis step (217) that is described with reference to FIG. 2. The first and second datapoints 312, 322 may be associated with one operator of the vehicle 5.

The first and second data subsets 310, 320 are plotted with the operator settings for the first of the operator-adjustable devices 10 being indicated on a first axis 302, the corresponding operator settings for the second of the operator-adjustable devices 10 being indicated on a second axis 304, and an associated trip number being indicated on a third axis 306. The first datapoints 312 are in the form of operator settings for a first of the operator-adjustable devices 10 and corresponding operator settings for a second of the operator-adjustable devices 10 for each of a quantity of n trips. The first data subset 310 is associated with operation of the vehicle 5 with the operator settings to the operator-adjustable devices 10 at the start of each of the n trips without activation of the ADAS 50. The second datapoints 322 are in the form of operator settings for the second of the operator-adjustable devices 10 and corresponding operator settings for the second of the operator-adjustable devices 10 for each of the n trips. The second data subset 320 is associated with operation of the vehicle 5 with the operator settings to the operator-adjustable devices 10 during each of then trips during activation of one of the subsystems 55 of the ADAS 50. A plurality of singularities 330 in the form of data outliers are also shown.

Referring again to FIG. 2, and with continued reference to FIG. 1, the results of the cluster analysis (217) may be arranged in tabular form and reduced to practice as a lookup table that is stored in the settings database 70 of the controller 60 for interrogation and updating during vehicle operation. An example of a lookup table may be as shown with reference to Table 2, below.

TABLE 2

| | | Operator 1 | |
| --- | --- | --- | --- |
| Operator-adjustable device | Base setting | Setting with Subsystem "A" enabled | Setting with Subsystem "B" enabled |
| Seat back | | | |
| Seat longitudinal position | | | |
| Left Mirror position | | | |
| HVAC temperature | | | |
| Radio Setting | | | |

There may be a plurality of the lookup tables that correspond to individual operators, including. e.g., Operator 1. The parameters contained in the lookup table of Table 2 are in the form of settings for the actuators 20 to control the operator-adjustable devices 10. The parameters contained in the lookup table include base settings for the actuators 20, and settings for the actuators 20 when various ones of the subsystems 55 of the ADAS 50, depicted in Table 2 as Subsystem "A" and System "B". The settings for the actuators 20 when various ones of the subsystems 55 of the ADAS 50 may be in the form of settings having absolute values, or settings that are scaled in relation to the base settings for the actuators 20.

Referring again to FIG. 2, the lookup table described in Table 2 may be subject to review and updating during each trip after the nth trip for each operator. This includes detecting occurrence of a new trip (221)(1), and monitoring to detect activation of one or more of the subsystems 55 of the ADAS 50 and usage of one of the operator assistance features (222)(1), along with detected changes to the operator settings to the operator-adjustable devices 10, if present, after its activation. Such data is subjected to the cluster analysis (223), which includes calculating proposed updates to some or all of the data contained in the lookup table shown with reference to Table 2 based upon the detected changes to the operator settings to the operator-adjustable devices 10, if present, after its activation (224). The operator may be asked to confirm that the proposed updates are valid (225), and if so (225)(1), the lookup table is updated to include the proposed updates (226). Otherwise, the present operator settings are unchanged (227).

Overall, the operator profile development flowchart 200 includes capturing an initial operator profile as a baseline at a start of each trip, wherein the initial operator profile includes settings to the operator-adjustable devices 10 for one of the operators. During each trip, operator usage of the ADAS 50 is monitored to capture any change in personal settings after enabling these features.

Figure 4:
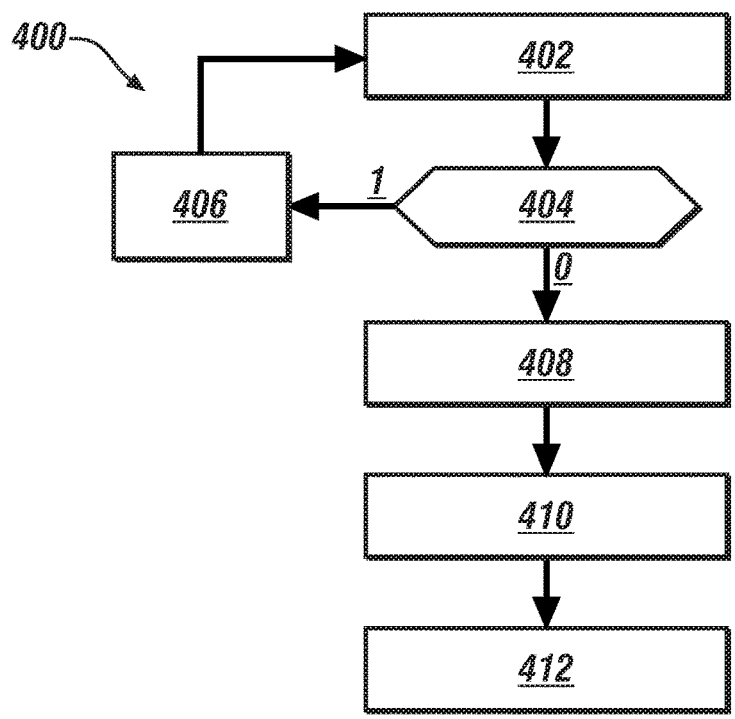
FIG. 4 schematically shows a block diagram of an element of an operator recognition system to identify one or more vehicle operators, in accordance with the disclosure.

Referring now to FIG. 4, with continued reference to FIG. 1, a routine 400 may be executed by the operator recognition system 40 to identify one or more vehicle operators, including e.g., a first operator and a second operator. As described with reference to FIG. 1, the operator recognition system 40 is composed of one or more devices and systems that communicates with and interacts with the handheld device 46 that is carried by the vehicle operator, wherein the handheld device 46 has been preprogrammed to communicate with the operator recognition system 40 via the telematics device 45. The operator recognition system 40 may include an on-vehicle system through which the vehicle operator is identified. The routine 400 includes steps of positioning the vehicle operator in a field of view of a measurement camera with their handheld device 46 being proximal thereto (402). The measurement camera (not shown) may be on-vehicle, or may be separate from the vehicle 5. Steps are taken to ensure that there is a single handheld device 46 proximal to the camera (404, 406), and the measurement camera captures one or more images from which biometric information in the form of facial features, body posture, body dimensions, etc. may be correlated to the vehicle operator (408). The biometric information is transformed into default settings for the specifically identified operator, e.g., Operator 1, and assigned and the settings database 70 to facilitate access the vehicle operator's credentials and obtain settings for the operator-adjustable devices 10, e.g., seat position, HVAC temperature settings, etc.

In this manner, the concepts described herein enable detection and automatic adjustment of operator settings when the ADAS 50 operates, including detecting changes in an operator profile when the above features are enabled, without a need for additional on-vehicle or external hardware.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including one or a plurality of executable instruction sets that implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a vehicle, wherein the vehicle includes an advanced driver-assistance system (ADAS), the method comprising:
    identifying a first vehicle operator;
    capturing a plurality of operator-selectable settings associated with a plurality of operator-adjustable devices during each of a plurality of trips, wherein the operator-selectable settings include a first subset of the operator-selectable settings associated with non-autonomous operation of the vehicle by the first vehicle operator during each of the plurality of trips;
    capturing the plurality of the operator-selectable settings associated with the plurality of operator-adjustable devices, wherein the operator-selectable settings include a second subset of the operator-selectable settings associated with activation of a first subsystem of the ADAS by the first vehicle operator;
    determining a base profile for the first vehicle operator based upon the first subset of the operator-selectable settings associated with non-autonomous operation of the vehicle captured during the plurality of trips, wherein determining the base profile for the first vehicle operator based upon the first subset of the operator-selectable settings comprises executing a cluster analysis of the first subset of the operator-selectable settings;
    determining a second profile for the first vehicle operator based upon the second subset associated with a first level of autonomous operation of the vehicle;
    controlling the plurality of operator-adjustable devices to the operator-selectable settings associated with the base profile when the vehicle is operated by the first vehicle operator under the non-autonomous operation; and
    controlling the plurality of operator-adjustable devices to the operator-selectable settings associated with the second profile in response to the activation of the first subsystem of the ADAS when the vehicle is operated by the first vehicle operator at the first level of autonomous operation of the vehicle.

2. The method of claim 1, further comprising:
    capturing the plurality of the operator-selectable settings associated with the plurality of operator-adjustable devices, wherein the operator-selectable settings include a third subset of the operator-selectable settings associated with activation of a second subsystem of the ADAS by the first vehicle operator;
    determining a third profile for the first vehicle operator based upon the third subset associated with the second subsystem of the ADAS of the vehicle; and
    controlling the plurality of operator-adjustable devices to the operator-selectable settings associated with the third profile in response to the activation of the first-second subsystem of the ADAS.

3. The method of claim 1, further comprising capturing the plurality of the operator-selectable settings associated with the plurality of operator-adjustable devices during each of a plurality of trips, wherein the operator-selectable settings include the second subset of the operator-selectable settings associated with activation of the first subsystem of the ADAS by the first vehicle operator.

4. The method of claim 3, wherein determining the second profile for the first vehicle operator based upon the second subset of the operator-selectable settings comprises executing a cluster analysis of the second subset of the operator-selectable settings.

5. The method of claim 1, further comprising
    identifying a second vehicle operator;
    capturing the plurality of operator-selectable settings associated with the plurality of operator-adjustable devices, wherein the operator-selectable settings include the first subset of the operator-selectable settings associated with non-autonomous operation of the vehicle by the second vehicle operator;
    capturing the plurality of the operator-selectable settings associated with the plurality of operator-adjustable devices, wherein the operator-selectable settings include a second subset of the operator-selectable settings associated with activation of a first subsystem of the ADAS by the second vehicle operator;
    determining a base profile for the second vehicle operator based upon the first subset associated with non-autonomous operation of the vehicle;
    determining a second profile for the second vehicle operator based upon the second subset of the operator-selectable settings;
    controlling the plurality of operator-adjustable devices to the operator-selectable settings associated with the base profile when the vehicle is operated by the second vehicle operator under the non-autonomous operation; and
    controlling the plurality of operator-adjustable devices to the operator-selectable settings associated with the second profile in response to the activation of the first subsystem of the ADAS when the vehicle is operated by the second vehicle operator at the first level of autonomous operation of the vehicle.

6. The method of claim 1, wherein the first subsystem of the ADAS comprises one of an adaptive cruise control system, a lane-keeping control system, a lane change control system, and an autonomous braking/collision avoidance system.

7. A vehicle, comprising:
an advanced driver-assistance system (ADAS) including a first subsystem and a second subsystem,
a plurality of operator-adjustable devices;
a controller, in communication with the ADAS and the plurality of operator-adjustable devices, the controller including an instruction set, the instruction set executable to:
identify a first vehicle operator;
capture a plurality of operator-selectable settings associated with the plurality of operator-adjustable devices, wherein the operator-selectable settings include a first subset of the operator-selectable settings associated with non-autonomous operation of the vehicle by the first vehicle operator;
capture the plurality of the operator-selectable settings associated with the plurality of operator-adjustable devices during each of a plurality of trips, wherein the operator-selectable settings include a second subset of the operator-selectable settings associated with activation of a first subsystem of the ADAS by the first vehicle operator;
determine a base profile for the first vehicle operator based upon the first subset associated with non-autonomous operation of the vehicle;
execute a cluster analysis of the second subset of the operator-selectable settings to determine a second profile for the first vehicle operator based upon the second subset associated with a first level of autonomous operation of the vehicle;
control the plurality of operator-adjustable devices to the operator-selectable settings associated with the base profile when the vehicle is operated by the first vehicle operator under the non-autonomous operation; and
control the plurality of operator-adjustable devices to the operator-selectable settings associated with the second profile in response to the activation of the first subsystem of the ADAS when the vehicle is operated by the first vehicle operator at the first level of autonomous operation of the vehicle.

8. The vehicle of claim 7, further comprising the instruction set being executable to:
capture the plurality of the operator-selectable settings associated with the plurality of operator-adjustable devices, wherein the operator-selectable settings include a third subset of the operator-selectable settings associated with activation of a second subsystem of the ADAS by the first vehicle operator;
determine a third profile for the first vehicle operator based upon the third subset associated with the second subsystem of the ADAS of the vehicle; and
control the plurality of operator-adjustable devices to the operator-selectable settings associated with the third profile in response to the activation of the first second subsystem of the ADAS.

9. The vehicle of claim 7, further comprising the instruction set being executable to capture the plurality of operator-selectable settings associated with the plurality of operator-adjustable devices during each of a plurality of trips, wherein the operator-selectable settings include the first subset of the operator-selectable settings associated with non-autonomous operation of the vehicle by the first vehicle operator during each of the plurality of trips.

10. The vehicle of claim 9, further comprising the instruction set being executable to determine the base profile for the first vehicle operator based upon the first subset of the operator-selectable settings associated with non-autonomous operation of the vehicle capturing during the plurality of trips.

11. The vehicle of claim 10, wherein the instruction set being executable to execute a cluster analysis of the first subset of the operator-selectable settings to determine the base profile for the first vehicle operator based upon the first subset of the operator-selectable settings.

12. The vehicle of claim 7, further comprising the instruction set being executable to
identify a second vehicle operator;
capture a plurality of operator-selectable settings associated with a plurality of operator-adjustable devices, wherein the operator-selectable settings include a first subset of the operator-selectable settings associated with non-autonomous operation of the vehicle by the second vehicle operator;
capture the plurality of the operator-selectable settings associated with the plurality of operator-adjustable devices, wherein the operator-selectable settings include a second subset of the operator-selectable settings associated with activation of a first subsystem of the ADAS by the second vehicle operator;
determine a base profile for the second vehicle operator based upon the first subset associated with non-autonomous operation of the vehicle;
determine a second profile for the second vehicle operator based upon the second subset associated with the first level of autonomous operation of the vehicle;
control the plurality of operator-adjustable devices to the operator-selectable settings associated with the base profile when the vehicle is operated by the second vehicle operator under the non-autonomous operation; and
control the plurality of operator-adjustable devices to the operator-selectable settings associated with the second profile in response to the activation of the first subsystem of the ADAS when the vehicle is operated by the second vehicle operator at the first level of autonomous operation of the vehicle.

13. The vehicle of claim 7, wherein the first subsystem of the ADAS comprises one of an adaptive cruise control system, a lane-keeping control system, a lane change control system, or an autonomous braking/collision avoidance system.

* * * * *